March 12, 1963      D. A. MAURO      3,080,697
CUTTING BLADE FOR ROTARY MOWER
Filed Dec. 30, 1960
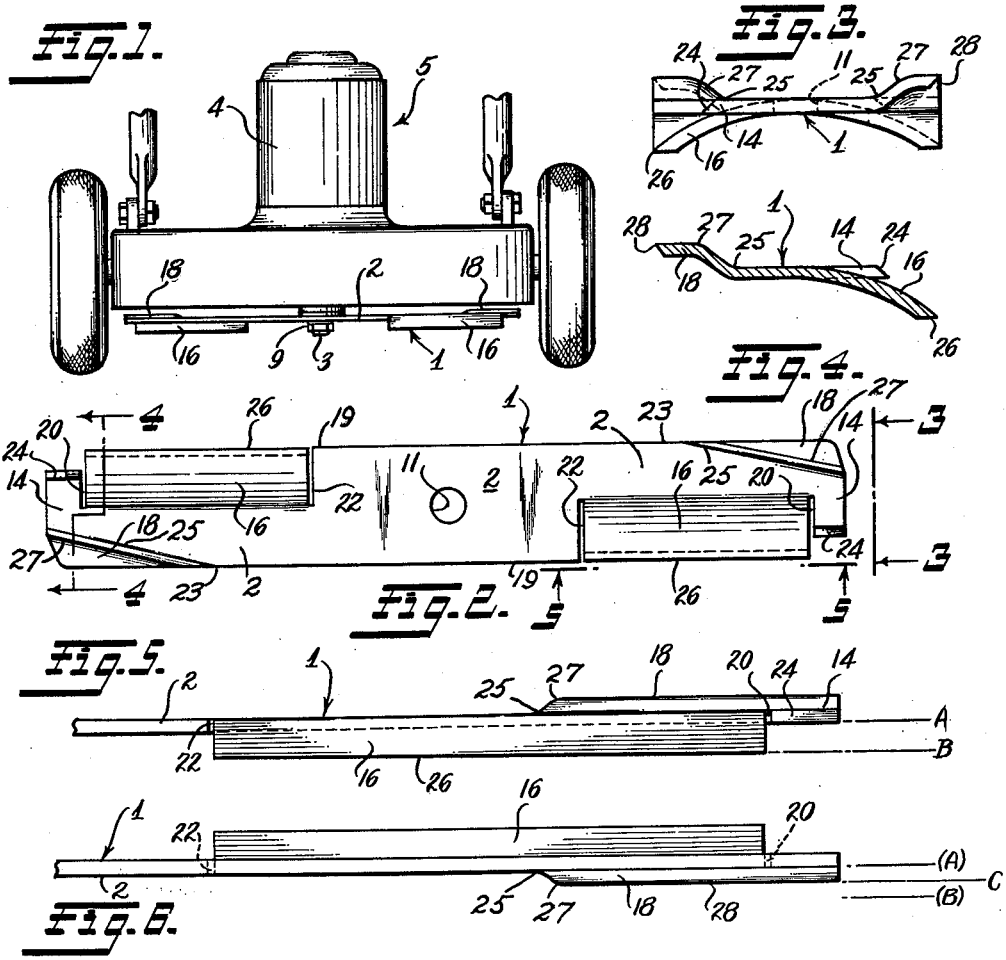
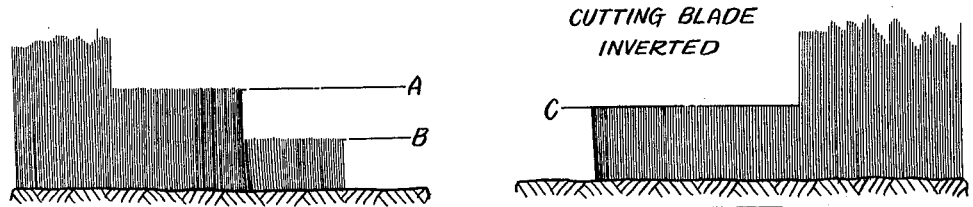
INVENTOR.
Daniel A. Mauro
BY Bacon & Thomas
ATTORNEYS 3,080,697
CUTTING BLADE FOR ROTARY MOWER
Daniel A. Mauro, 4657 Malden Ave., Liftwood, Wilmington, Del.
Filed Dec. 30, 1960, Ser. No. 79,658
9 Claims. (Cl. 56—295)

This invention relates to a cutting blade for lawn mowers and more particularly to an improved blade for rotary-type lawn mowers.

It has been found desirable when mowing tall grass with a rotary-type mower to cut first at a higher level and then at a lower level in order to cut the lawn smoothly and evenly and to reduce the size of the cuttings. The cutting device for rotary mowers which is disclosed in my prior patent, 2,908,128, will cut a lawn very satisfactorily in this manner. At certain times, however, it may be desirable to employ the same rotary mower for rough-cutting tall grass or weeds or for cutting the lawn at a higher level without adjusting the mower or changing to another cutting blade. For example, during the dry season when the grass grows slowly, it has been found desirable to cut the grass at a higher level so that it will not burn and die out. It is, therefore, an object of this invention, which is an improvement over the one disclosed in my aforementioned patent to provide a cutting blade which may be employed to mow the grass at one level when rotated in one direction or to mow it at another level when rotated in a reverse direction without adjusting the height of the mower in the usual manner.

Another object is to provide a reversible cutting blade which is adapted to mow at different levels when installed in conventional rotary-type lawn mowers.

It is also an object of this invention to provide a cutting blade for a rotary-type lawn mower which is adapted to cut at two different levels simultaneously or at only a single level, as desired.

Another object is to provide a single cutting blade which is adapted to smoothly and evenly finish-cut a lawn or alternatively, to rough-cut tall grass and weeds at a level higher than the finish cut.

Another object is to provide a single cutting blade which is adapted to combine the advantages of two or more conventional blades.

Another object is to provide a cutting blade which is versatile, strong, durable, easily sharpened and economical to manufacture.

Other objects and advantages of this invention will be apparent from the following description when taken in conjunction with the accompanying drawings, in which:

FIG. 1 is a front elevational view disclosing the instant blade mounted on a rotary mower;

FIG. 2 is an enlarged top plan view of the cutting blade shown in FIG. 1;

FIG. 3 is an enlarged and elevational view of the cutting blade looking in the direction of the arrows 3—3 of FIG. 2;

FIG. 4 is an enlarged sectional view taken on the line 4—4 of FIG. 2;

FIG. 5 is an enlarged fragmentary front elevational view looking in the direction of arrows 5—5 of FIG. 2;

FIG. 6 is an enlarged fragmentary front elevational view of the cutting blade of FIG. 5 in inverted position;

FIG. 7 is a diagrammatic view illustrating the action of a cutting blade made in accordance with the present invention when rotated clockwise with the cutting blade disposed in a horizontal plane as ilustrated in FIG. 5; and FIG. 8 is a diagrammatic view illustrating the action of the cutting blade when disposed as illustrated in FIG. 6, and rotated clockwise in a horizontal plane.

Referring more particularly to the drawings, the cutting blade 1 is adapted to be mounted in the conventional manner in a horizontal plane on the power shaft 3 of the motor 4 of a rotary mower 5, as by means of a nut 9, the shaft 3 extending through an aperture 11 formed in the center of the body of the cutting blade.

The cutting blade 1 is formed from an elongated strip of suitable metal and each end section 2 of the blade 1, on opposite sides of aperture 11, provides a portion having three cutter portions designated as 14, 16 and 18. As opposite end sections of the blade are identical in structure and method of operation, like numerals have been employed to designate like elements.

First and second cutter portions 14 and 16, respectively, are formed on the leading edge 19 of each end section 2 of blade 1. The first cutter portion 14 at each end of blade 1 is disposed on the leading edge 19 of the blade at the outer extremity thereof and may be separated from the second cutter portion 16 by a cut 20 which extends inwardly from the leading edge 19 to a point approximately midway of the width of blade 1. Preferably cutter portion 14 and the body of blade 1 lie in the same horizontal plane.

The second cutter portion 16 at each end of blade 1 is disposed radially inward on the respective leading edge 19 from the first cutter portion 14 and each extends from the respective cut 20 to a cut 22 which is parallel to and spaced radially inward from the cut 20. Cutter portion 16 is preferably curved downwardly, as best illustrated in FIGS. 3, 4 and 5, by bending this portion of blade 1.

A third cutter portion 18 is formed at each end of blade 1, on the trailing edge 23 of the blade 1 at the outer extremity thereof, and faces in the opposite direction from the cutting portions 14 and 16 formed on the respective end section. Cutter portion 18 is formed by bending a portion of the trailing edge of blade 1 upwardly at 25 and then horizontally at 27 in such a manner that this portion is off-set with respect to the main body of blade 1 with cutter portion 18 lying in a horizontal plane above the main plane of the cutting blade 1 as best illustrated in FIGS. 3, 4 and 5.

In order to cut the grass and weeds cleanly and easily, it is intended that the outer edges 24, 26, and 28 of cutter portions 14, 16, and 18 respectively, be sharpened in any convenient manner to provide sharp cutting edges lying in parallel planes.

It is preferable that the vertical distance between the horizontal planes passing through cutting edge 24 and cutting edge 28, respectively, be approximately one-half of the vertical distance between the horizontal planes passing through cutting edge 24 and cutting edge 26, respectively. In other words, cutting edge 28 would be spaced above cutting edge 24 approximately one-half of the distance of the spacing of cutting edge 26 below cutting edge 24. The vertical spacing between cutting edge 24 and cutting edge 28, as related to the vertical spacing between cutting edge 24 and cutting edge 26 may be varied in the event that it is desired to increase or decrease the distance between the cuts produced by cutting edges 26 and 28.

In operation, when the blade 1 is attached to mower 5 with cutting edge 26 lowermost as illustrated in FIGS. 1, 3, 4, and 5 and rotated in a clockwise direction as viewed in FIG. 2. cutting edges 24 and 26 will produce a cut of the type illustrated in FIG. 7. The first cutting edge 24 will produce a primary cut at a level indicated by A in FIG. 7 while the second cutting edge 26 will produce the finish cut at a level indicated by B. It will be evident that by employing the blade disposed in this manner that a smooth and even finish cut will be produced and that the cuttings will be reduced in size. At this time, the off-set cutter portion 18 serves to create an updraft tending to hold the grass upright for easy cutting.

In the event that it is desired to rough-cut tall grass or weeds or to cut the lawn at a level higher than the level produced by cutting edge 26 without adjusting the mower in the usual manner, it is only necessary to invert the blade 1 on power shaft 3. In FIG. 6, the cutting blade 1 is shown in inverted position with cutting edge 28 lowermost. By rotating the blade, as thus disposed, in a clockwise direction, a cut will be produced by cutting edge 28 which will be at the level indicated by C in FIG. 8. By comparing FIGS. 7 and 8 it will be observed that the level of cut C produced by cutting edge 28 is above the level of cut B produced by cutting edge 26 and approximately midway between the levels A and B cut by cutting edges 24 and 26, respectively. When rotated in this manner, cutter portion 16 serves to create an updraft for easy cutting.

In the event that motor 4 is reversible, cutting blade 1 could be rotated in a counterclockwise direction as viewed in FIG. 2 when attached to mower 5 with cutting edge 26 lowermost as illustrated in FIGS. 1, 3, 4, and 5. When employed in this manner, cutting edge 28 would cut at a level above the level indicated at A in FIG. 7.

It will be understood that various changes in the design and details of construction of the cutting blade described herein may be made without departing from the principles of the invention or the scope of the annexed claims.

I claim:

1. A reversible cutting blade for a rotary type lawn mower comprising: an elongated body portion disposed in a horizontal plane; a first horizontal cutting edge formed on the leading edge of one end of said body portion; a second horizontal cutting edge formed radially inwardly of said first cutting edge on said leading edge and lying in a horizontal plane disposed below said first cutting edge, said first and second cutting edges cutting at two different levels when said cutter member is rotated in one direction; the trailing edge of said one end of said body portion being offset upwardly from the plane of said body portion and lying in a horizontal plane disposed above said first cutting edge, said trailing edge being sharpened to form a third cutting edge on said body portion for cutting when said blade is rotated in the other direction and for creating an updraft during rotation of said blade in said one direction.

2. A reversible cutting blade for a rotary type lawn mower comprising: an elongated body portion disposed in a horizontal plane; a first horizontal cutting edge formed on the outer end of the leading edge of one end of said body portion; a portion of said leading edge of said one end of said body portion disposed radially inwardly of said first cutting edge being bent downwardly; a second horizontal cutting edge on the leading edge of said downwardly bent portion and lying in a horizontal plane spaced below a horizontal plane passing through said first cutting edge; the trailing edge of one end of said body portion being offset upwardly from said body portion; a third horizontal cutting edge on the trailing edge of said offset portion and lying in a horizontal plane disposed above said body portion, said offset portion creating an updraft when said blade is rotated in one direction with said first and second cutting edges cutting at two different levels, the horizontal plane passing through said third cutting edge, being spaced from said horizontal plane passing through said first cutting edge a distance less than the spacing between said horizontal plane passing through said second cutting edge and said horizontal plane passing through said first cutting edge; said third cutting edge cutting at a level between the level of cut of said first and second cutting edges when said cutting blade is inverted and rotated in said one direction, said second cutting edge creating an updraft when said cutting blade is rotated in said one direction with said third cutting edge cutting.

3. A reversible cutting blade for a rotary type lawn mower comprising: an elongated, horizontally disposed body portion, each end of said body portion being formed with a first horizontal cutting edge on the leading edge thereof; a portion of said leading edge at each of said ends of said body portion disposed radially inwardly of said first cutting edge being bent downwardly; a second horizontal cutting edge on the leading edge of said downwardly bent portions and lying in a horizontal plane spaced below a horizontal plane passing through said first cutting edges; the trailing edge at each of said ends of said body portion being offset upwardly from said body portion; a third horizontal cutting edge on the trailing edge of said offset portions and lying in a horizontal plane disposed above said body portion for creating an updraft when said blade is rotated in one direction with said first and second cutting edges cutting at two different levels, the horizontal plane passing through said third cutting edges being spaced from said horizontal plane passing through said first cutting edges a distance less than the spacing between said horizontal plane passing through said second cutting edges and said horizontal plane passing through said first cutting edges, said third cutting edges cutting at a level between the level of cut of said first and second cutting edges when said cutting blade is inverted and rotated in said one direction, said second cutting edges creating an updraft when said cutting blade is rotated in said one direction with said third cutting edges cutting.

4. A reversible cutting blade for a rotary type lawn mower having a vertical shaft comprising: a rigid, elongated body portion fixedly mounted on said shaft end disposed in a horizontal plane; the leading edge of one end of said body portion being bent downwardly from the plane of said body portion; a first horizontal cutting edge on said leading edge and lying in a first horizontal plane spaced below said body portion; the trailing edge of one end of said body portion being offset upwardly from said plane of said body portion; a second horizontal cutting edge on said trailing edge and lying in a second horizontal plane spaced above said body portion and creating an updraft when said blade is rotated in one direction with said first cutting edge cutting at a level below the level of said body portion, said first cutting edge creating an updraft when said cutting blade is inverted and rotated in said one direction with said second cutting edge cutting at a level below the level of said body portion.

5. A reversible cutting blade for a rotary type lawn mower comprising: an elongated body portion disposed in a horizontal plane; a first horizontal cutting edge formed on the outer end of the leading edge of one end of said body portion; a portion of said leading edge of said one end of said body portion disposed radially inwardly of said first cutting edge being bent downwardly; a second horizontal cutting edge on the leading edge of said downwardly bent portion and lying in a horizontal plane spaced below a horizontal plane passing through said first cutting edge; the trailing edge of one end of said body portion being offset upwardly from said body portion; a third horizontal cutting edge on the trailing edge of said offset portion and lying in a horizontal plane disposed above said body portion, said offset portion creating an updraft when said blade is rotated in one direction with said first and second cutting edges cutting at two different levels, said third cutting edge cutting at a level below the level of said body portion when said cutting blade is inverted and rotated in said one direction, said second cutting edge creating an updraft when said cutting blade is rotated in said one direction with said third cutting edge cutting.

6. A reversible cutting blade for a rotary type lawn mower comprising: an elongated, horizontally disposed body portion, each end of said body portion being formed with a first horizontal cutting edge on the leading edge thereof; a portion of said leading edge at each of said ends of said body portion disposed radially inwardly of said first cutting edge being bent downwardly; a second horizontal cutting edge on the leading edge of said downwardly bent portions and lying in a horizontal plane spaced below a horizontal plane passing through said first cutting edges; the trailing edge at each of said ends of said body portion being offset upwardly from said body portion; a third horizontal cutting edge on the trailing edge of said offset portions and lying in a horizontal plane disposed above said body portion for creating an updraft when said blade is rotated in one direction with said first and second cutting edges cutting at two different levels; said third cutting edges cutting at a level below the level of said body portion when said cutting blade is inverted and rotated in said one direction, said second cutting edges creating an updraft when said cutting blade is rotated in said one direction with said third cutting edges cutting.

7. A cutting blade as defined in claim 1, wherein the distance between the horizontal planes passing through said first and said second cutting edges is greater than the distance between the horizontal planes passing through said first and said third cutting edges.

8. A cutter member as defined in claim 2, wherein the horizontal planes passing through said first and third cutting edges are spaced apart a distance equal to substantially one half of the distance between the horizontal planes passing through said first and second cutting edges.

9. A cutting blade as defined in claim 2, wherein said first horizontal cutting edge is disposed substantially in a horizontal plane passing through said elongated body portion.

References Cited in the file of this patent

UNITED STATES PATENTS

| | | |
|---|---|---|
| 1,622,611 | Sera | Mar. 29, 1927 |
| 2,576,884 | Leigh | Nov. 27, 1951 |
| 2,682,142 | Clark | June 29, 1954 |
| 2,891,369 | Rietz | June 23, 1959 |
| 2,908,128 | Mauro | Oct. 13, 1959 |
| 2,924,058 | Brooks | Feb. 9, 1960 |
| 2,963,844 | Engler | Dec. 13, 1960 |